United States Patent
Ohta

(10) Patent No.: US 9,674,821 B2
(45) Date of Patent: Jun. 6, 2017

(54) WIRELESS COMMUNICATIONS SYSTEM, MOBILE STATION, BASE STATION, AND COMMUNICATION METHOD

(71) Applicant: FUJITSU LIMITED, Kawasaki-shi, Kanagawa (JP)

(72) Inventor: Yoshiaki Ohta, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 114 days.

(21) Appl. No.: 14/547,879

(22) Filed: Nov. 19, 2014

(65) Prior Publication Data

US 2015/0078307 A1    Mar. 19, 2015

Related U.S. Application Data

(63) Continuation of application No. PCT/JP2012/063819, filed on May 29, 2012.

(51) Int. Cl.
*H04W 72/04* (2009.01)
*H04W 52/02* (2009.01)
*H04W 76/04* (2009.01)

(52) U.S. Cl.
CPC ... *H04W 72/0406* (2013.01); *H04W 52/0216* (2013.01); *H04W 76/048* (2013.01)

(58) Field of Classification Search
None
See application file for complete search history.

(56) References Cited

U.S. PATENT DOCUMENTS

| | | | |
|---|---|---|---|
| 2004/0029586 A1* | 2/2004 | Laroia | H04W 16/12 455/434 |
| 2004/0072559 A1 | 4/2004 | Kakumaru et al. | |
| 2009/0310503 A1* | 12/2009 | Tenny | H04W 68/00 370/252 |
| 2009/0323607 A1 | 12/2009 | Park et al. | |
| 2010/0009687 A1* | 1/2010 | Koivisto | H04W 72/005 455/450 |
| 2010/0135159 A1* | 6/2010 | Chun | H04W 72/1289 370/241 |

(Continued)

FOREIGN PATENT DOCUMENTS

| | | |
|---|---|---|
| JP | 2004-128949 A | 4/2004 |
| JP | 2012-004608 A | 1/2012 |

(Continued)

OTHER PUBLICATIONS

3GPP TS36.321 V10.4.0 "3rd Generation Partnership Project; Technical Specification Group Radio Access Network; Evolved Universal Terrestrial Radio Access (E-UTRA); Medium Access Control (MAC) protocol specification (Release 10)", Dec. 2011.

(Continued)

*Primary Examiner* — Kodzovi Acolatse
(74) *Attorney, Agent, or Firm* — Myers Wolin, LLC

(57) ABSTRACT

A wireless communications system includes a base station and a mobile station. The base station transmits a second control signal used for configuring a first interval during which a first control signal having a plurality of formats is monitored and a second interval that is different from the first interval. The mobile station monitors the first control signal for the plurality of the formats during the first interval, and monitors the first control signal for formats fewer than the plurality of the formats during the second interval.

10 Claims, 16 Drawing Sheets

(56) References Cited

U.S. PATENT DOCUMENTS

| | | |
|---|---|---|
| 2010/0215011 A1 | 8/2010 | Pan et al. |
| 2011/0085458 A1* | 4/2011 | Montojo ............... H04L 1/0038 370/252 |
| 2011/0105162 A1 | 5/2011 | Kim et al. |
| 2011/0261768 A1* | 10/2011 | Luo ........................ H04L 5/001 370/329 |
| 2012/0120858 A1* | 5/2012 | Das ................... H04W 52/0229 370/311 |
| 2013/0003604 A1* | 1/2013 | Blankenship ......... H04L 5/0053 370/255 |
| 2013/0003663 A1* | 1/2013 | Blankenship ......... H04L 5/0053 370/329 |
| 2013/0028098 A1 | 1/2013 | Yuda et al. |
| 2013/0039291 A1* | 2/2013 | Blankenship ........... H04L 5/001 370/329 |
| 2013/0107742 A1 | 5/2013 | Ishii |
| 2013/0183987 A1* | 7/2013 | Vrzic .................... H04L 1/0046 455/450 |
| 2013/0242882 A1* | 9/2013 | Blankenship ....... H04W 72/042 370/329 |
| 2015/0003311 A1 | 1/2015 | Feuersaenger et al. |

FOREIGN PATENT DOCUMENTS

| | | |
|---|---|---|
| JP | 2015-512178 A | 4/2015 |
| KR | 10-2009-0086441 A | 8/2009 |
| WO | 2011-135796 A1 | 11/2011 |
| WO | 2013/110372 A1 | 8/2013 |

OTHER PUBLICATIONS

3GPP TS 36.133 V10.6.0 "3rd Generation Partnership Project; Technical Specification Group Radio Access Network; Evolved Universal Terrestrial Radio Access (E-UTRA); Requirements for support of radio resource management (Release 10)", Mar. 2012.

3GPP TS 36.213 V10.4.0 "3rd Generation Partnership Project; Technical Specification Group Radio Access Network; Evolved Universal Terrestrial Radio Access (E-UTRA); Physical layer procedures (Release 10)", Dec. 2011.

Samsung, "PDCCH Blind Decoding Operations for CA", Agenda Item 6.2.3.1, 3GPP TSG-RAN WG1 #61bis, R1-103631, Dresden, Germany, Jun. 28-Jul. 2, 2010.

International Preliminary Report on Patentability for corresponding International Patent Application No. PCT/JP2012/063819 mailed on Dec. 11, 2014 with English translation.

International Preliminary Report on Patentability with Written Opinion of the International Searching Authority for corresponding International Patent Application PCT/JP2012/063819 mailed on Dec. 11, 2014.

Extended European search report with supplementary European search report and the European search opinion issued by the European Patent Office for corresponding European Patent Application No. 12878077.2, mailed on Apr. 20, 2015.

Research in Motion, UK Limited, "Reduction of Blind Decodes for Carrier Aggregation", Agenda Item: 6.2.1.1, 3GPP TSG RAN WG1 Meeting #62, R1-104915, Madrid, Spain, Aug. 23-27, 2010.

Notice of Preliminary Rejection issued for corresponding Korean Patent Application No. 10-2014-7033555 mailed on Aug. 17, 2015 with an English translation.

Office Action issued for corresponding Japanese Patent Application No. 2014-518136 issued on Sep. 29, 2015 with a partial English translation.

Offce Action issued for corresponding Japanese Patent Application No. 2014-518136 issued on Dec. 22, 2015 with a partial English translation.

\* cited by examiner

| SEARCH SPACE | AGGREGATION LEVEL | AGGREGATION SIZE | PDCCH CANDIDATE COUNT |
|---|---|---|---|
| MOBILE STATION SPECIFIC | 1 | 6 | 6 |
| | 2 | 12 | 6 |
| | 4 | 8 | 2 |
| | 8 | 16 | 2 |
| CELL SPECIFIC | 4 | 16 | 4 |
| | 8 | 16 | 2 |

FIG.11

| | PAYLOAD SIZE A | PAYLOAD SIZE B | PAYLOAD SIZE C | PAYLOAD SIZE D | TOTAL |
|---|---|---|---|---|---|
| MOBILE STATION SPECIFIC | 0, 1A<br>6+6+2+2=16 | -<br>0 | 1, 1B, 1D, 2, 2A<br>6+6+2+2=16 | 4<br>6+6+2+2=16 | 48 |
| CELL SPECIFIC | 0, 1A, 3, 3A<br>2+6=6 | 1C<br>2+6=6 | -<br>0 | -<br>0 | 12 |
| | | | | | 60 |

1100

WIRELESS COMMUNICATIONS SYSTEM, MOBILE STATION, BASE STATION, AND COMMUNICATION METHOD

CROSS REFERENCE TO RELATED APPLICATIONS

This application is a continuation application of International Application PCT/JP2012/063819, filed on May 29, 2012 and designating the U.S., the entire contents of which are incorporated herein by reference.

FIELD

The embodiments discussed herein are related to a wireless communications system, a mobile station, a base station, and a communication method.

BACKGROUND

A wireless communications system conventionally uses intermittent reception to reduce power consumption of a mobile station (see, e.g., Japanese Laid-Open Patent Publication No. 2004-128949). Discontinuous reception (DRX) is defined as an intermittent reception mode by the 3rd Generation Partnership Project (3GPP) (see, e.g., 3GPP TS36.321, "Medium Access Control (MAC) Protocol Specification", V10.4.0, Release 10, Dec. 2011; 3GPP TS36.133, "Requirements for support of radio resource management", V10.6.0, Release 10, Mar. 2012; and 3GPP TS36.213, "Physical layer procedures", V10.4.0, Release 10, Dec. 2011). The use of DRX is associated with configuration of an interval requiring monitoring of a downlink control signal (referred to as an ON-interval for convenience) and an interval not requiring monitoring of a downlink control signal (referred to as an OFF-interval for convenience).

SUMMARY

According to an aspect of an embodiment, a wireless communications system includes a base station and a mobile station, where the base station transmits a second control signal used for configuring a first interval during which a first control signal having a plurality of formats is monitored and a second interval that is different from the first interval; and the mobile station monitors the first control signal for the plurality of the formats during the first interval, and monitors the first control signal for formats fewer than the plurality of the formats during the second interval.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 is a diagram of an example of the number of executions of blind decoding.

DESCRIPTION OF EMBODIMENTS

Embodiments of a wireless communications system, a mobile station, a base station, and a communication method will be described in detail with reference to the accompanying drawings.

Figure 1:
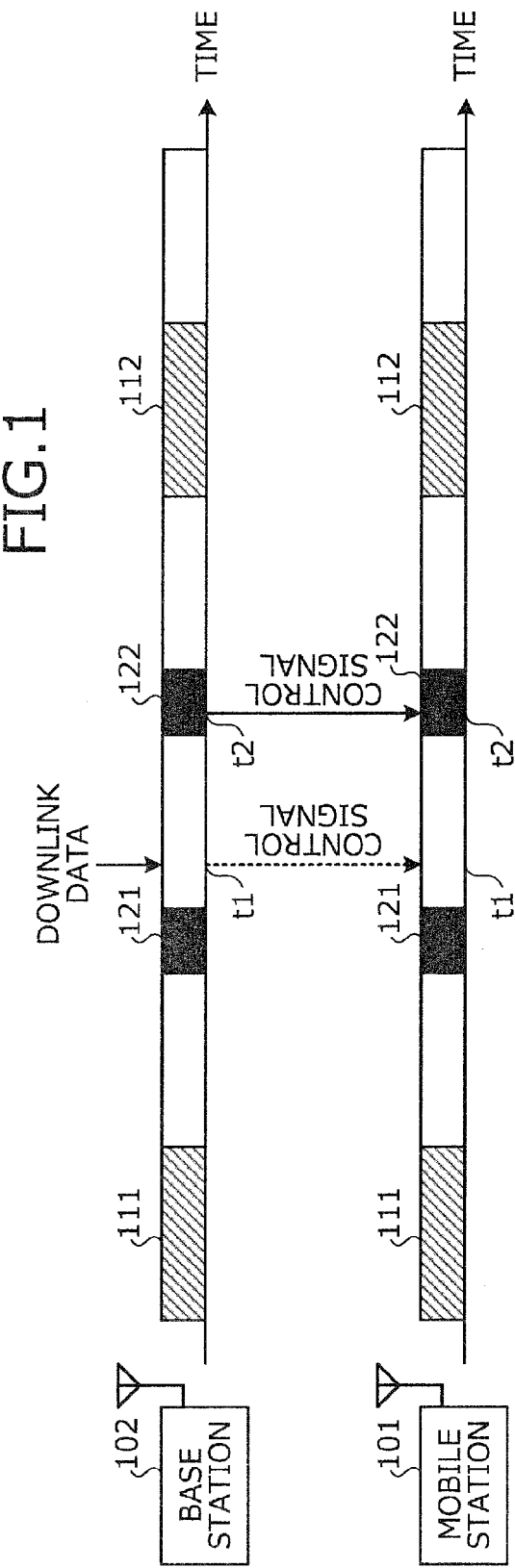
FIG. 1 is a diagram of an example of a wireless communications system according to a first embodiment.

FIG. 1 is a diagram of an example of a wireless communications system according to a first embodiment. As depicted in FIG. 1, the wireless communications system according to the first embodiment includes a mobile station 101 and a base station 102. The base station 102 is an evolved Node B (eNB), for example. The mobile station 101 is User Equipment ((UE), a user terminal), for example. The mobile station 101 and the base station 102 wirelessly communicate with each other. The mobile station 101 performs intermittent reception (e.g., DRX), i.e., intermittently performs reception operation of receiving wireless signals from the base station 102.

The horizontal axis in FIG. 1 indicates the elapse of time. ON-intervals 111, 112, . . . are time intervals (active time) configured commonly for the base station 102 and the mobile station 101. The ON-intervals 111, 112, . . . are periodically configured, for example. The ON-intervals 111, 112, . . . are time intervals based on DRX (DRX cycle), for example.

The base station 102 transmits a control signal for the mobile station 101 in the ON-intervals 111, 112, . . . . The mobile station 101 monitors a control signal in the ON-intervals 111, 112, . . . . The control signal is a physical downlink control channel (PDCCH) that is a downlink control signal of Layer 1 (L1), for example. For example, the ON-intervals 111, 112, . . . are time intervals requiring monitoring of the PDCCH by the mobile station 101.

In this description, the control signal is the PDCCH. The PDCCH includes information that indicates wireless resources (e.g., time and frequency) by which the base station 102 transmits a downlink signal addressed to the mobile station 101. The mobile station 101 can receive the downlink signal from the base station 02 based on the PDCCH. The PDCCH may include information that indicates wireless resources (e.g., time and frequency) by which the mobile station 101 should transmit uplink data to the base station 102. The mobile station 101 transmits the uplink signal to the base station 102 using the wireless resources indicated by the PDCCH.

Check points 121, 122, . . . are time intervals configured commonly for the base station 102 and the mobile station 101 separately from the ON-intervals 111, 112, . . . . The check points 121, 122, . . . are periodically configured in intervals in which the ON-intervals 111, 112, . . . are not configured, for example.

The check points 121, 122, . . . are determined by the base station 102, for example, and configured to the mobile station 101 and the base station 102. For example, the base station 102 determines the number N (N is a natural number of one or greater) of the check points in each interval other than the ON-intervals 111, 112, . . . , and notifies the mobile station 101 of the determined number N (N=2 in the example depicted in FIG. 1). For example, the base station 102 determines the number N of the check points based on an arrival pattern (traffic pattern) of downlink data to the mobile station 101.

The base station 102 configures the check points 121, 122, . . . such that each interval other than the ON-intervals 111, 112, . . . is equally divided by the number N+1 (equally divided into three portions in the example depicted in FIG. 1). The mobile station 101 also configures the check points 121, 122, . . . such that each interval other than the ON-intervals 111, 112, . . . is equally divided by the number N+1 (equally divided into three portions in the example depicted in FIG. 1) based on the number N reported from the base station 102. As a result, the common check points 121, 122, . . . can be configured at the mobile station 101 and the base station 102.

However, the method of configuring the check points 121, 122, . . . is not limited hereto. For example, the base station 102 may determine an interval or timing of the check points and notify the mobile station 101 of the result of determination. The mobile station 101 configures the check points 121, 122, . . . based on the determination result reported from the base station 102. As a result, the common check points 121, 122, . . . can be configured at the mobile station 101 and the base station 102.

Alternatively, the mobile station 101 may determine the number, an interval, or timing of the check points 121, 122, . . . and notify the base station 102 of the result of determination. The base station 102 configures the check points 121, 122, . . . based on the determination result reported from the mobile station 101. As a result, the common check points 121, 122, . . . can be configured in the mobile station 101 and the base station 102.

The base station 102 transmits the PDCCH for the mobile station 101 also at the check points 121, 122, . . . . The base station 102 transmits the PDCCH having limited types of formats as compared to the PDCCH transmitted in the ON-intervals 111, 112, . . . .

The mobile station 101 monitors the PDCCH also at the check points 121, 122, . . . . However, the mobile station 101 monitors the PDCCH of limited types of formats as compared to the monitoring in the ON-intervals 111, 112, . . . . As a result, the mobile station 101 can monitor the PDCCH from the base station 102 while suppressing the power consumption as compared to the monitoring in the ON-intervals 111, 112, . . . .

A time interval different from the ON-intervals 111, 112, . . . and the check points 121, 122, . . . is an OFF-interval without transmission of the PDCCH to the mobile station 101 by the base station 102 and monitoring of the PDCCH from the base station 102 by the mobile station 101. In the OFF-interval, the mobile station 101 is shifted to a power saving mode because a signal process such as a data process is not necessary. For example, the mobile station 101 turns off a reception system (e.g., a baseband processing unit) to terminate at least a portion of a reception process. However, the mobile station 101 may execute a reception process for performing wireless measurement (e.g., the same frequency measurement or different frequency measurement) (see, e.g., Non-Patent Literature 2).

A specific example of operation of the mobile station 101 and the base station 102 depicted in FIG. 1 will be described. For example, it is assumed that downlink data addressed to the mobile station 101 is generated at the base station 102 at time t1 between the check point 121 and the check point 122. However, time t1 is neither the ON-intervals 111, 112, . . . nor the check points 121, 122, . . . , the base station 102 does not transmit the PDCCH to the mobile station 101 at time t1. The base station 102 transmits the PDCCH at time t2 included in the check point 122 after time t1.

Although the mobile station 101 monitors the PDCCH from the base station 102 during the ON-interval 111 and the check point 121, the PDCCH addressed to the mobile station 101 is not detected and, therefore, the mobile station 101 enters the OFF-interval again. At the check pint 122, the mobile station 101 detects the PDCCH addressed to the mobile station 101.

When detecting the PDCCH at the check point 122, the mobile station 101 receives the downlink data from the base station 102 as is the case with the reception of the PDCCH during the ON-intervals 111, 112, . . . . The reception of the downlink data can be achieved by receiving wireless resources indicated by the received PDCCH among physical downlink shared channels (PDSCHs), for example.

As described above, the mobile station 101 and the base station 102 can add intervals of monitoring of the PDCCH (the check points 121, 122, . . . ) in the intermittent reception, thereby suppressing data delay consequent to a delay of transmission of the PDCCH.

For example, assuming that the check points 121, 122, . . . are not configured in the example depicted in FIG. 1, the mobile station 101 monitors the PDCCH only during the ON-intervals 111, 112, . . . . Therefore, if the downlink data to the mobile station 101 is generated at time t1, the PDCCH cannot be transmitted from the base station 102 to the mobile station 101 until the next ON-interval 112, delaying the transmission of data. If the interval between the ON-intervals 111, 112, . . . is made shorter, the power consumption required for monitoring the PDCCH increases.

On the other hand, according to the mobile station 101 and the base station 102, the PDCCH can be transmitted from the base station 102 to the mobile station 101 at the check point 122 after time t1 to transmit the downlink data from the base station 102 to the mobile station 101. Therefore, data delay can be suppressed.

Since only the PDCCH having limited formats is used at the added check points 121, 122, . . . , an increase in the power consumption required for monitoring the PDCCH can be suppressed even if the mobile station 101 monitors the PDCCH for an increased number of times.

Although the wireless communications system including the mobile station 101 and the base station 102 is described by way of example, this is not a limitation of the architecture of the wireless communications system. For example, the wireless communications system depicted in FIG. 1 may be architecture such that a relay station is deployed instead of the mobile station 101. Alternatively, the wireless communications system depicted in FIG. 1 may be architecture such that a relay station is deployed instead of the base station 102.

An example of a method of configuring the ON-intervals 111, 112, ... will be described. For example, the ON-intervals 111, 112, ... are configured by the base station 102 notifying the mobile station 101 of DRX parameters by using a control signal (Radio Resource Control (RRC)) of Layer 3 (L3) at the start of communication between the mobile station 101 and the base station 102. A start subframe of DRX is defined by a function of a system frame number. The DRX parameters include an on-duration timer, for example. The intervals during operation of the on-duration timer are defined as the ON-intervals 111, 112, ....

However, although the ON-intervals are basically defined by the ON-duration timer, the ON-intervals can be extended by another timer. For example, an interval configured as an ON-interval may be the interval during activation of a DRX-inactivity timer activated when the PDCCH giving notification of the arrival of new data is received.

An interval configured as an ON-interval may be an interval during activation of a HARQ RTT timer activated regardless of whether data is new or retransmitted, so as to manage an RTT (8 [ms] in FDD) of a hybrid automatic repeat request (HARQ).

An interval configured as an ON-interval may be an interval during activation of a DRX-retransmission timer activated if data reception is not successful even when the HARQ RTT timer expires, so as to allow retransmission during the activation thereof.

An interval configured as an ON-interval may be an interval of short DRX to which the mobile station 101 is transitioned if the DRX-retransmission timer expires. The interval of short DRX is managed by a DRX-short cycle timer and, if the DRX-short cycle timer expires, the mobile station 101 is transitioned to long DRX. The interval of long DRX may also be configured as an ON-interval. Therefore, the ON-intervals are defined as the intervals during activation of the ON-duration timer, the DRX-inactivity timer, or the DRX-retransmission timer. In this case, the ON-intervals including the extended intervals may be referred to as an active time.

Description will be made of an example of a system to which the wireless communications system depicted in FIG. 1 is applied. The wireless communications system depicted in FIG. 1 is applicable to Long Term Evolution (LTE), for example. Under LTE, a mode based on orthogonal frequency division multiplexing (OFDM) is defined as a wireless access technique.

LTE enables high-speed wireless packet communication with a downlink peak transmission rate of 100 [Mb/s] or higher and an uplink peak transmission rate of 50 [Mb/s] or higher. The international standardization body, 3rd Generation Partnership Project (3GPP) has started study on the mobile wireless communications system LTE-Advanced (LTE-A) based on LTE so as to realize higher-speed communication.

The wireless communications system depicted in FIG. 1 is also applicable to LTE-A. A downlink peak transmission rate of 1 [Gb/s] and an uplink peak transmission rate of 500 [Mb/s] are set as targets of LTE-A, and techniques such as a wireless access mode and network architecture are under study.

A technique for realizing the high-speed transmission under LTE is carrier aggregation. Carrier aggregation is a technique of performing broadband communication by bundling and considering multiple (cells) as one high-bandwidth carrier during communication. For example, communication is performed by configuring a primary timing advanced group (pTAG), which is a cell group having first uplink timing and including a primary cell (PCell), and a secondary timing advance group (sTAG), which is a cell group including a secondary cell (SCell).

Under LTE-A (or LTE Rel-11), a mobile station is connected that generates traffic different from the conventional case. For example, a communication form is supposed in such a way that various devices such as a sensor and a gas meter are connected to a cellular network for communications. Such communication is referred to as machine-type communication.

One of the characteristics of traffic generated in machine-type communication is communication with regular time. For example, an electric meter and a gas meter transmit to a server, periodic reports concerning used amounts of electric power and gas. Another characteristic of the traffic generated in the machine-type communication is a relatively small amount of traffic.

A further characteristic of the traffic generated in machine-type communication is that devices don't move, and it is no longer important to design a system in consideration of mobility, which is a key factor of mobile communication. For example, an increase in the number of connected smartphones is also assumed. A smartphone generates traffic from an operation system (OS) and intermittent traffic from a large number of applications.

Figure 2:
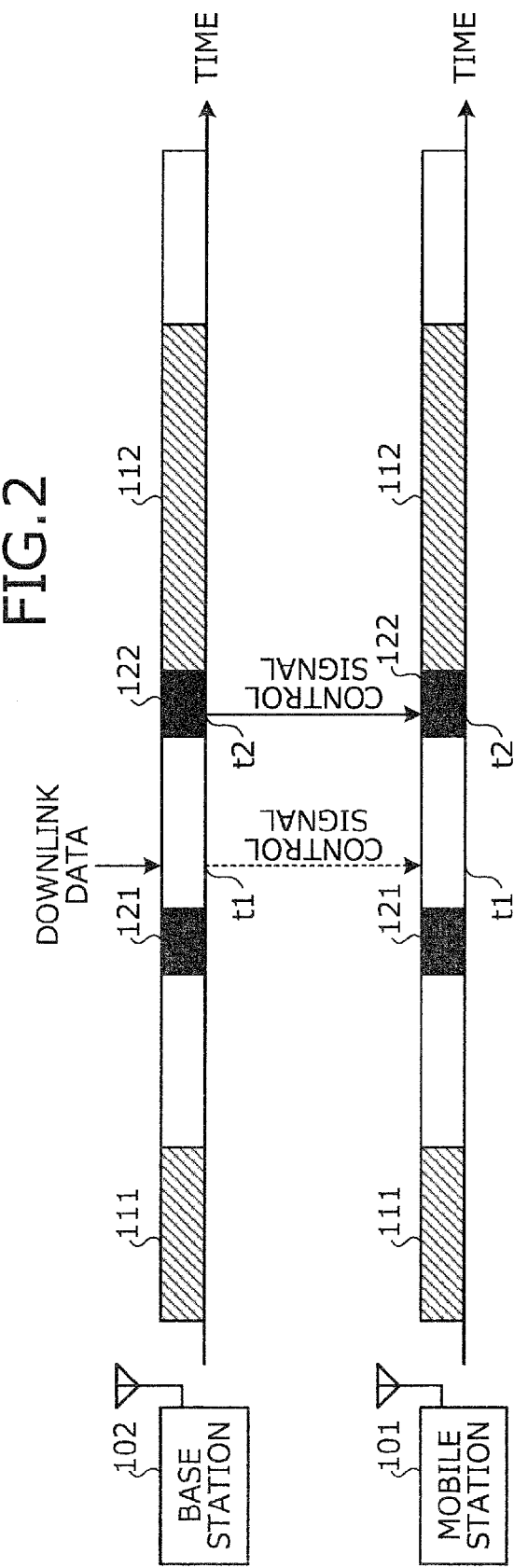
FIG. 2 is a diagram of a first variation of the wireless communications system according to the first embodiment.

FIG. 2 is a diagram of a first variation of the wireless communications system according to the first embodiment. In FIG. 2, portions identical to those described in the first embodiment are denoted by the same reference numerals used in the first embodiment and will not be described. As described in FIG. 2, if the PDCCH is transmitted at the check point 122, the mobile station 101 and the base station 102 may change the start time of the ON-interval 112 after the check point 122 to the time immediately after the check point 122.

As a result, even if the downlink data to the mobile station 101 cannot completely be transmitted based on the PDCCH at the check point 122, transition to the ON-interval 112 can be made immediately to achieve a PDCCH-transmittable state and the remaining downlink data to the mobile station 101 can be transmitted.

Figure 3:
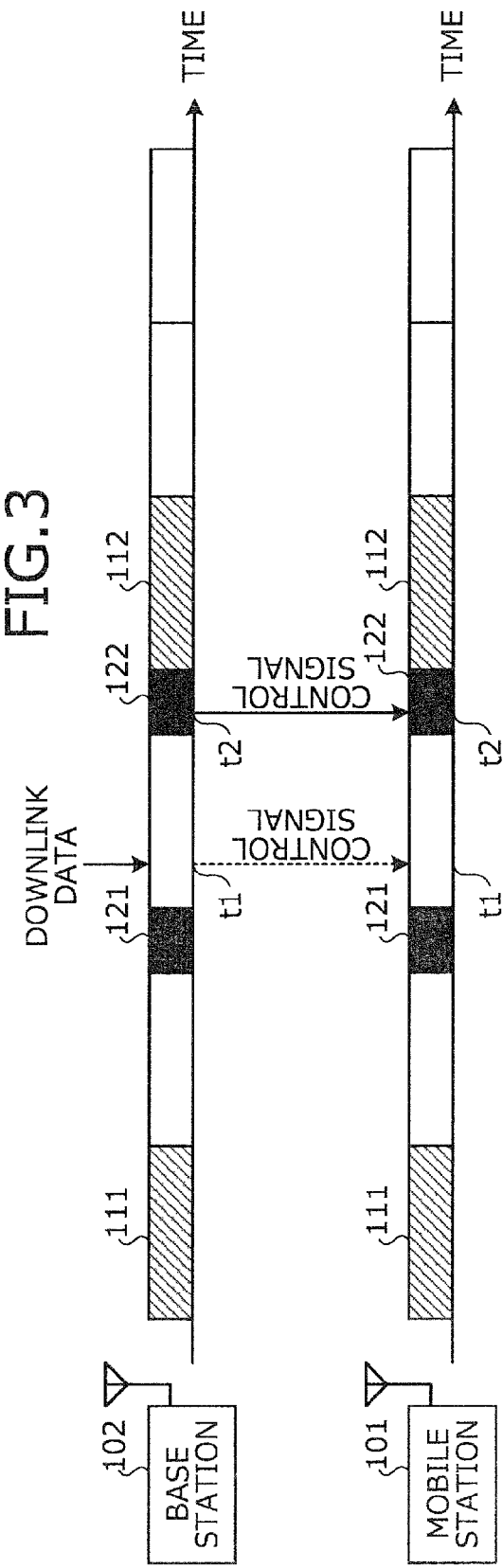
FIG. 3 is a diagram of a second variation of the wireless communications system according to the first embodiment.

FIG. 3 is a diagram of a second variation of the wireless communications system according to the first embodiment. In FIG. 3, portions identical to those described in the first embodiment are denoted by the same reference numerals used in the first embodiment and will not be described. As depicted in FIG. 3, if the PDCCH is transmitted at the check point 122, the mobile station 101 and the base station 102 may shift the ON-interval 112 after the check point 122 to the time immediately after the check point 122.

As a result, even if the downlink data to the mobile station 101 cannot be transmitted completely based on the PDCCH at the check point 122, transition to the ON-interval 112 can immediately be made to achieve a PDCCH-transmittable state and the remaining downlink data to the mobile station 101 can be transmitted.

As depicted in FIGS. 2 and 3, if the PDCCH is transmitted at the check point 122 from the base station 102 to the mobile station 101, the mobile station 101 and the base station 102 may advance the start time of the ON-interval 112 immediately after the check point 122.

As a result, even if the data transmission is not completed based on the PDCCH at the check point 122, transition to the ON-interval 112 can be made immediately to achieve a PDCCH-transmittable state and the remaining data transmission can be performed. Since the transition to the ON-interval 112 eliminates the limitation on the format of the PDCCH, this enables, for example, high-capacity data transmission, and transmission of the remaining data can quickly be performed.

Figure 4:
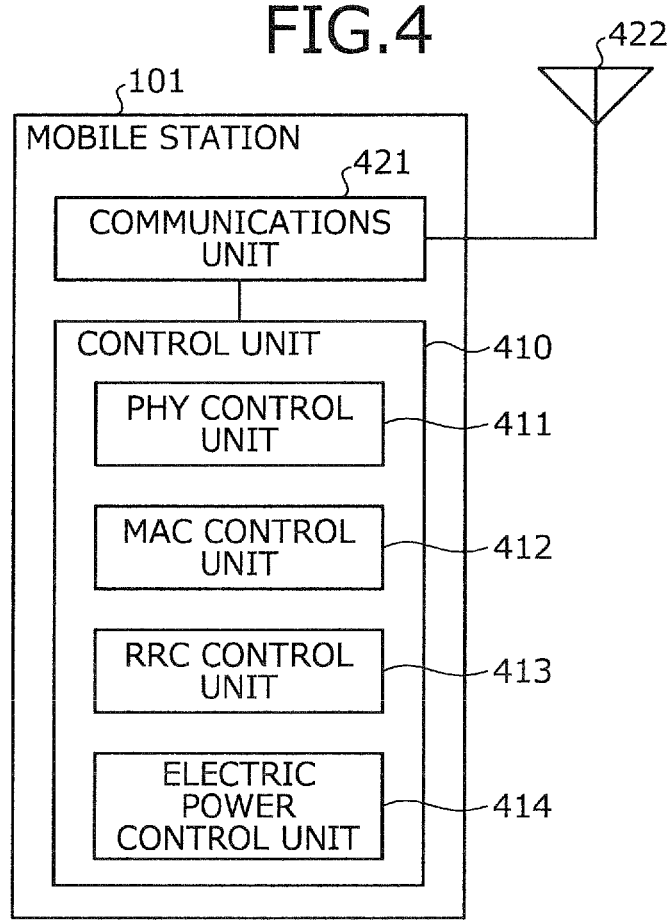
FIG. 4 is a diagram of an example of a structure of a mobile station.

FIG. 4 is a diagram of an example of a structure of the mobile station. As depicted in FIG. 4, the mobile station 101 includes a control unit 410, a communications unit 421, and an antenna 422, for example. The communications unit 421 executes transmission/reception processes of signals wirelessly transmitted via the antenna 422. The communications unit 421 processes radio frequency (RF) signals, for example.

The control unit 410 provides various controls of the mobile station 101. The control unit 410 is a baseband processing unit that processes baseband signals, for example. The control unit 410 includes a PHY control unit 411, a MAC control unit 412, an RRC control unit 413, and an electric power control unit 414.

The PHY control unit 411 processes signals when wireless transmission is performed. For example, the PHY control unit 411 performs wireless transmission according to modulation coding of wireless signals reported from the base station 102. For example, the PHY control unit 411 monitors a PDCCH and receives downlink data.

The MAC control unit 412 executes a process related to the scheduling of data based on wireless resources and timing specified by the base station 102. For example, the MAC control unit 412 performs the configuration of the ON-intervals 111, 112, . . . (DRX setup) and the configuration of the check points 121, 122, . . . . The MAC control unit 412 also monitors the PDDCH via the PHY control unit 411.

The RRC control unit 413 controls the operation of the mobile station 101. For example, the RRC control unit 413 performs the configuration of the wireless resource parameters used in communication (e.g., call setup) and the communication state management of the mobile station 101. For example, the RRC control unit 413 executes a process of making a transition from an RRC idle mode to an RRC connected mode for achieving a communicable state and a handover process for connecting to a proper base station.

The electric power control unit 414 provides various controls for reducing the power consumption of the mobile station 101. For example, the electric power control unit 414 turns off, for example, the baseband processing units such as the RRC control unit 413, the MAC control unit 412, and the PHY control unit 411 to make a transition to the power saving mode in the OFF-intervals. The electric power control unit 414 controls the PHY control unit 411 and the MAC control unit 412 such that the monitoring of the PDCCH is performed only for limited formats at the check points 121, 122, . . . .

Figure 5:
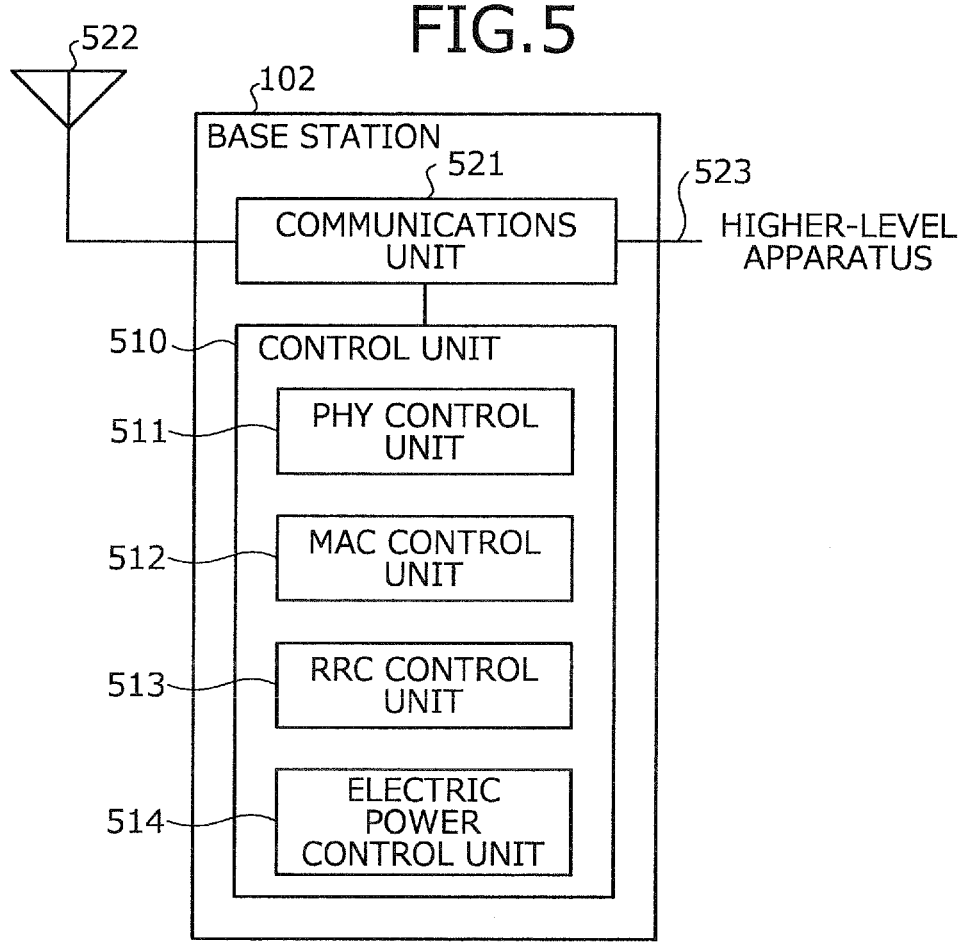
FIG. 5 is a diagram of an example of a structure of a base station.

FIG. 5 is a diagram of an example of a structure of the base station. As depicted in FIG. 5, the base station 102 includes a control unit 510, a communications unit 521, an antenna 522, and a wired interface 523. The communications unit 521 transmits and receives signals wirelessly transmitted via the antenna 522. The communications unit 521 transmits and receives signals transmitted through wires via the wired interface 523 for communication with a higher-level apparatus. The communications unit 521 executes transmission/reception processes of RF signals, for example.

The control unit 510 provides various controls of the base station 102. The control unit 510 is a baseband processing unit processing a baseband signal, for example. The control unit 510 includes a PHY control unit 511, a MAC control unit 512, an RRC control unit 513, and an electric power control unit 514.

The PHY control unit 511 processes signals when wireless transmission is performed. For example, the PHY control unit 511 determines a modulation coding mode of wireless signals. For example, the PHY control unit 511 transmits the PDCCH and downlink data to the mobile station 101 and receives uplink data from the mobile station 101.

The MAC control unit 512 executes a process related to scheduling of data. For example, the MAC control unit 512 performs the configuration of the ON-intervals 111, 112, . . . (DRX setup) and the configuration of the check points 121, 122, . . . . The MAC control unit 512 transmits the PDDCH via the PHY control unit 511.

The RRC control unit 513 controls the operation of the base station 102. For example, the RRC control unit 513 performs the configuration of the wireless resource parameters used in communication (e.g., call setup) and the communication state management of the base station 102. For example, the RRC control unit 513 executes a process of making a transition from the RRC idle mode to the RRC connected mode for achieving a communicable state and a handover process for connecting to a proper base station.

The electric power control unit 514 provides various controls for reducing the power consumption of the mobile station 101. For example, the electric power control unit 514 controls the PHY control unit 511 and the MAC control unit 512 such that the transmission of the PDCCH is performed only in limited formats at the check points 121, 122, . . . .

Figures 6, 7:
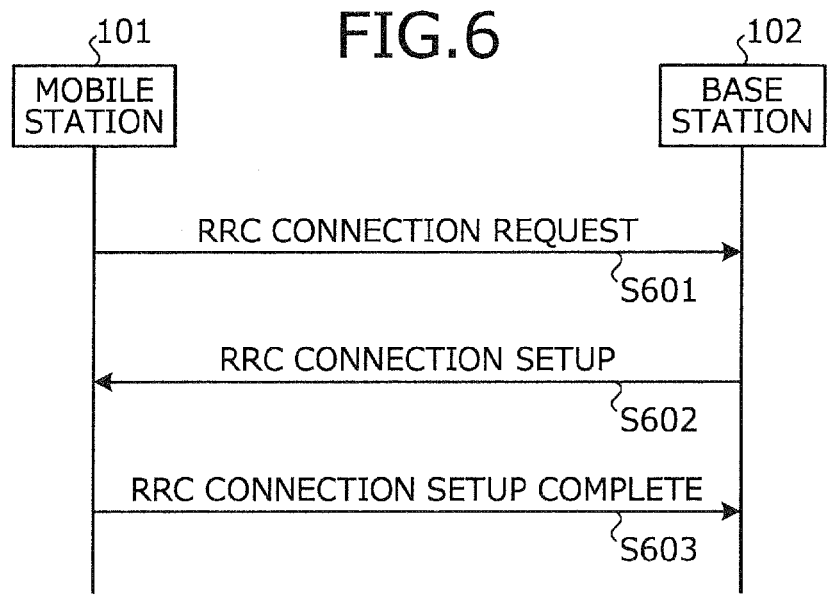
FIG. 6 is a diagram of an example of RRC call setup procedures.
FIG. 7 is a diagram of an example of a candidate count of PDCCHs.

FIG. 6 is a diagram of an example of RRC call setup procedures. The mobile station 101 and the base station 102 execute, for example, the following steps as the RRC call setup procedures. First, the mobile station 101 transmits an RRC connection request to the base station 102 (step S601).

The base station 102 transmits RRC connection setup to the mobile station 101 (step S602). The mobile station 101 transmits RRC connection setup complete to the base station 102 (step S603) and a series of the RRC call setup procedures is terminated.

The check points 121, 122, . . . can be configured by using the RRC connection setup transmitted at step S602, for example. For example, the base station 102 stores information that indicates the determined number N into "Radio Resource Config Dedicated", which is a parameter included in the RRC connection setup. As a result, the mobile station 101 can be notified of the number N determined by the base station 102. "Radio Resource Config Dedicated" is a parameter for configuring an individual wireless parameter, for example, a parameter of DRX, for the mobile station. Although a configuration method using the RRC connection setup is described in this example, "Radio Resource Config Dedicated" can be included in another message, for example, RRC Connection Reconfiguration.

If the number, an interval, or the timing of the check points is determined by the mobile station 101 and the base station 102 is notified of the result of determination, for example, the RRC connection setup complete of step S603 can be used for the notification of the determination result.

The mobile station 101 can detect the PDCCH (control signal) by, for example, blind decoding (see, e.g., 3GPP TS36.213, "Physical layer procedures", V10.4.0, Release 10, December 2011). For example, the mobile station 101 sequentially decodes PDCCHs transmitted from the base station 102 to detect the PDCCH addressed to the mobile station 101. The PDCCH addressed to the mobile station 101 can be determined by using information specific to the mobile station 101, for example.

For example, a PDCCH occupies a control channel element (CCE) at the time of transmission. The CCE is, for example, one wireless resource or multiple consecutive wireless resources.

The base station 102 generates a PDCCH for each mobile station including the mobile station 101 and assigns the PDCCH to CCEs based on the number of CCEs required for transmission of control information. The base station 102 maps the control information defined by a downlink control information format (DCI format) to physical resources corresponding to the CCEs assigned the PDCCH so as to transmit the control information.

For example, if the mobile station 101 is located near a cell boundary with poor propagation channel quality, it is required to configure a modulation coding scheme (MCS) at a lower MCS level to achieve the desired reception quality. Therefore, the base station 102 transmits a PDCCH occupying more CCEs (e.g., eight CCEs). On the other hand, if the mobile station 101 is located near the center of a cell with good propagation channel quality, the desired reception quality can be achieved even if an MCS at a higher MCS level is used. Therefore, the base station 102 transmits a PDCCH occupying fewer CCEs (e.g., one CCE).

FIG. 7 is a diagram of an example of the candidate count of PDCCHs. When transmitting PDCCHs, the base station 102 multiplexes and transmits the PDCCHs for the mobile stations including the mobile station 101 in one subframe at the same time. A table 700 depicted in FIG. 7 is an example of the candidate count of PDCCHs transmitted in one subframe by the base station 102.

As described in the table 700, the candidate count of PDCCHs is determined according to an aggregation level and an aggregation size. The aggregation level indicates the number of CCEs occupied by PDCCHs for one mobile station. The aggregation size indicates the number of CCEs occupied by all the PDCCHs. As described in the table 700, it is defined whether control information is mapped in a region specific to a cell or mapped in a region specific to a mobile station depending on a type of the control information at the time of mapping to physical resources.

The base station 102 does not notify the mobile station 101 of an aggregation level, etc. in terms of which physical resource the control information is mapped to for the mobile station 101. Therefore, the mobile station 101 autonomously detects the presence/absence of the PDCCH addressed to the mobile station 101 by blind decoding, for example.

For example, the mobile station 101 attempts to detect and decode PDCCHs for each aggregation level and each search space to detect the PDCCH addressed to the mobile station 101. Since the blind decoding is executed by baseband units of the mobile station 101, the number of times the blind decoding is executed is preferably cut down to reduce power consumption.

Figure 8:
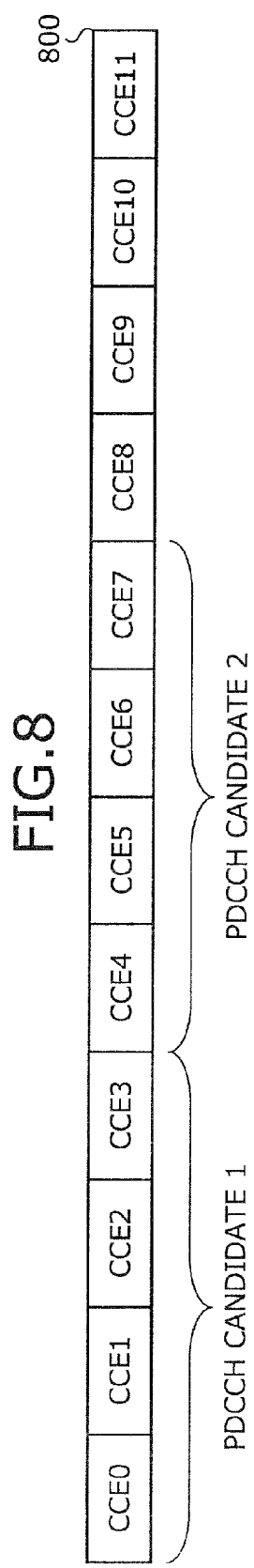
FIG. 8 is a diagram of an example of mapping of PDCCHs when an aggregation level is four.
Figure 9:
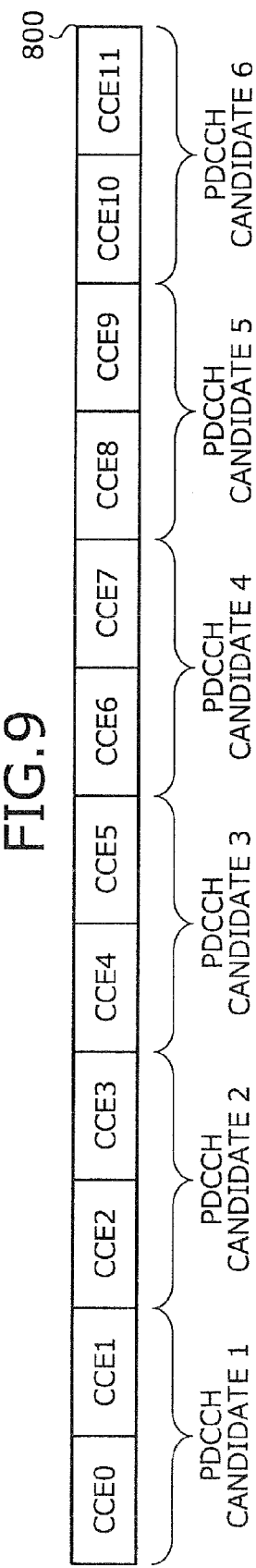
FIG. 9 is a diagram of an example of mapping of PDCCHs when the aggregation level is two.

FIG. 8 is a diagram of an example of mapping of PDCCHs when the aggregation level is four. FIG. 9 is a diagram of an example of mapping of PDCCHs when the aggregation level is two. A leading portion 800 depicted in FIGS. 8 and 9 represents a leading portion of a subframe. When the aggregation level is four, as depicted in FIG. 8, the base station 102 assigns two PDCCHs (PDCCH candidates 1, 2) to the leading portion 800, for example, and transmits each of the PDCCHs through four CCEs.

If the aggregation level is two, as depicted in FIG. 9, the base station 102 assigns six PDCCHs (PDCCH candidates 1 to 6) to the leading portion 800, for example, and transmits each of the PDCCHs through two CCEs.

Figure 10:
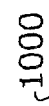
FIG. 10 is a diagram of an example of DCI formats used for the PDCCHs.

FIG. 10 is a diagram of an example of DCI formats used for the PDCCHs. A table 1000 depicted in FIG. 10 indicates an example of the DCI formats used for the PDCCHs, a payload size of each DCI format, and a search space (mobile-station-specific or cell-specific) to which each DCI format is mapped.

As depicted in the table 1000, the CDI formats used for the PDCCHs include 11 types, i.e., "0", "1", "1A", "1B", "1C", "1D", "2", "2A", "3", "3A", and "4", for example.

The DCI format "0" is used for a control signal for the transmission of a physical uplink shared channel (PUSCH). The DCI format "1" is used for a control signal for transmission of a PDSCH. The DCI format "1A" is used for a control signal for specifying the transmission of a compact PDSCH and the initiation of random access.

The DCI format "1B" is used for a control signal for the transmission of a PDSCH at the time of transmission diversity. The DCI format "1C" is used for a control signal for the transmission of a very compact PDSCH (such as broadcast information). The DCI format "1D" is used for a control signal for the transmission of a PDSCH at the time of transmission diversity when the control signal is associated with precoding information and electric power offset.

The DCI format "2" is used for a control signal for the transmission of a PDSCH in a downlink closed-loop spatial multiplexing mode. The DCI format "2A" is used for a control signal for the transmission of a PDSCH in a downlink open-loop spatial multiplexing mode.

The DCI format "3" is used for a control signal for two-bit electric power control for PUCCHs and PDSCHs for multiple mobile stations. The DCI format "3A" is used for a control signal for one-bit electric power control for PUCCHs and PDSCHs for multiple mobile stations. The DCI format "4" is used for a control signal for the transmission of a PUSCH in an uplink spatial multiplexing mode.

The payload sizes of the DCI formats are classified into four types (e.g., sizes A to C) and are designed to reduce the number of executions of the blind decoding.

FIG. 11 is a diagram of an example of the number of executions of the blind decoding. A table 1100 depicted in FIG. 11 indicates an example of the number of execution of the blind decoding by the mobile station 101. As depicted in FIG. 11, if it is attempted to detect a PDCCH for each of the payload sizes in each of the search spaces, the number of executions of the blind decoding is at most 60.

Since uplink Multiple-Input Multiple-Output (MIMO) is not defined in LTE Rel-10, the decoding of the DCI format "4" may not be attempted. Even in the case of LTE-A, the decoding of the DCI format "4" may not be attempted if uplink MIMO is not configured. If the decoding of the DCI format "4" is not attempted, the number of times of the blind decoding is at most 44.

Among the DCI formats, the base station 102 transmits the PDCCHs in arbitrary formats according to purpose, during the ON-intervals 111, 112, . . . . The base station 102 transmits the PDCCHs only in limited formats among the DCI formats, at the check points 121, 122, . . . . Therefore, the mobile station 101 can execute the blind decoding only for the limited formats at the check points 121, 122, . . . , thereby detecting the PDCCH addressed to the mobile station 101. As a result, the number of executions of the blind decoding decreases and power consumption can be suppressed.

Various combinations are employable for the DCI formats used at the check points 121, 122, . . . . For example, the formats may be such that only the DCI formats "0", "1A", and "1C" are used at the check points 121, 122, . . . . In this case, the mobile station 101 merely needs to monitor the DCI formats of the sizes A and B and, therefore, the maximum number of executions of the blind decoding is 28.

Alternatively, the formats may be such that only the DCI formats "1A" and "1C" are used at the check points 121, 122, . . . . This means that the mobile station 101 does not resume the blind decoding even if a PSCCH for uplink data transmission is received. As a result, the number of types of formats to be detected is decreased from three to two, and the probability of false detection can be reduced. Also in this case, the mobile station 101 merely needs to monitor the DCI formats of the sizes A and B and, therefore, the maximum number of executions of the blind decoding is 28.

The DCI formats used at the check points 121, 122, . . . can be determined by the base station 102, for example, and configured to the mobile station 101 by signaling from the base station 102 at the time of setup of communication. Alternatively, the DCI formats used at the check points 121, 122, . . . can be configured preliminarily in the mobile station 101 and the base station 102.

Figure 12:
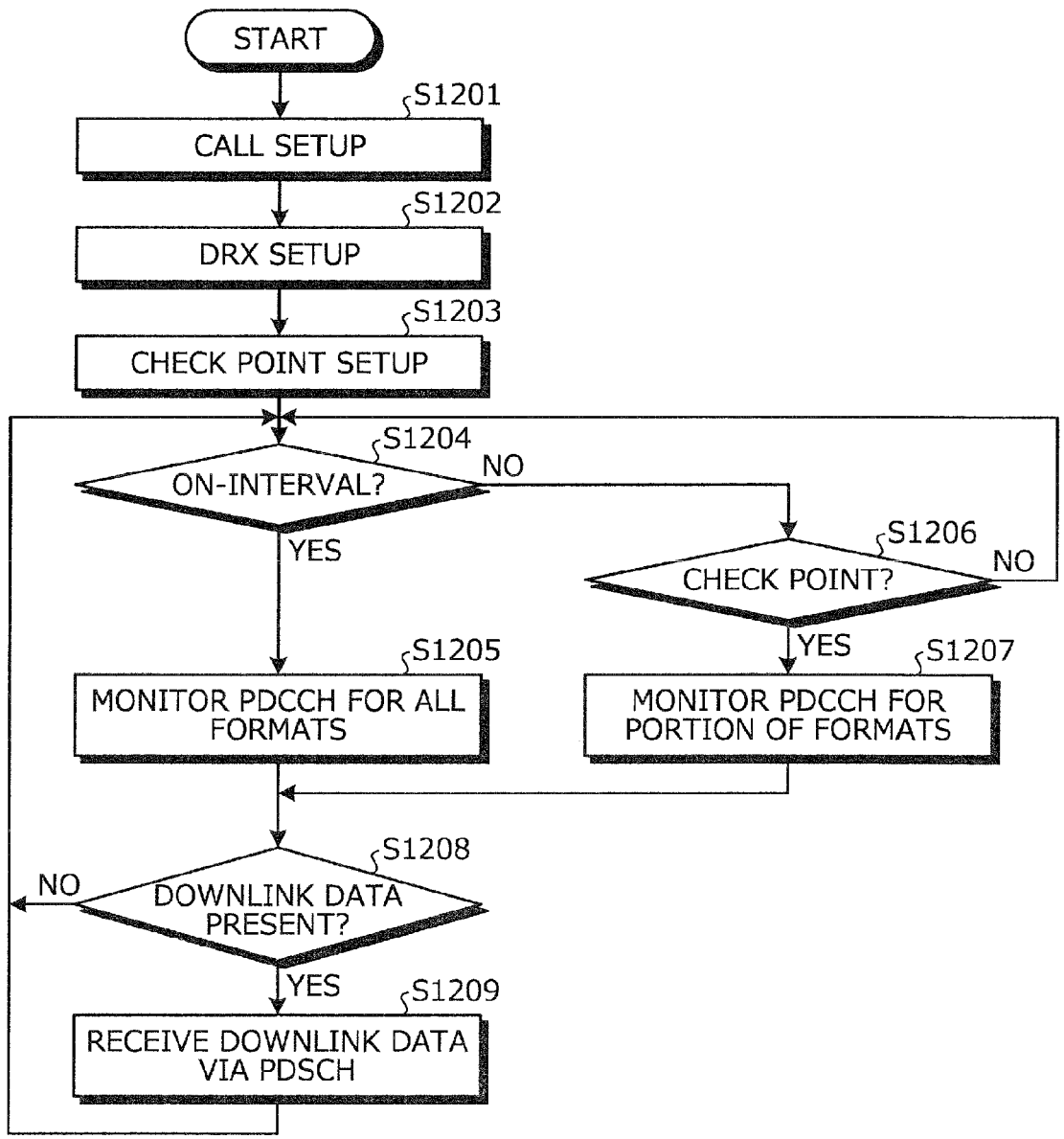
FIG. 12 is a flowchart of an example of operation of the mobile station according to the first embodiment.

FIG. 12 is a flowchart of an example of operation of the mobile station according to the first embodiment. The mobile station 101 according to the first embodiment executes the following steps, for example. First, the mobile station 101 performs call setup with the base station 102 (step S1201). For example, the mobile station 101 performs the call setup with the base station 102 according to the operation depicted in FIG. 6.

The mobile station 101 performs DRX setup for configuring the ON-intervals 111, 112, . . . (step S1202). The mobile station 101 performs check-point setup for configuring the check points 121, 122, . . . (step S1203). For example, the mobile station 101 performs the DRX setup of step S1202 and the check-point setup of step S1203 based on parameters reported from the base station 102 in the call setup of step S1202. The order of the DRX setup of step S1202 and the check-point setup of step S1203 may be changed.

The mobile station 101 determines whether the current time is within an ON-interval (step S1204). If the current time is within an ON-interval (step S1204: YES), the mobile station 101 monitors the PDCCH for all the formats (step S1205) and goes to step S1208. If the current time is not within an ON-interval (step S1204: NO), the mobile station 101 determines whether the current time is a check point (step S1206).

If the current time is not a check point (step S1206: NO), the mobile station 101 returns to step S1204 without monitoring the PDCCHs. If the current time is at a check point (step S1206: YES), the mobile station 101 monitors the PDCCH only for a portion of the formats (step S1207).

The mobile station 101 determines whether downlink data addressed to the mobile station 101 is present based on a result of the monitoring of the PDCCH at step S1205 or step S1207 (step S1208). If downlink data is not present (step S1208: NO), the mobile station 101 returns to step S1204.

If downlink data is present at step S1208 (step S1208: YES), the mobile station 101 receives the downlink data addressed to the mobile station 101 through the PDSCH (step S1209) and returns to step S1204.

With the steps described above, the mobile station 101 can monitor the PDCCH during the ON-intervals and at the check points and can monitor the PDCCH only for limited formats at the check points. The mobile station 101 can receive the downlink data based on the monitoring result of the PDCCHs.

Figure 13:
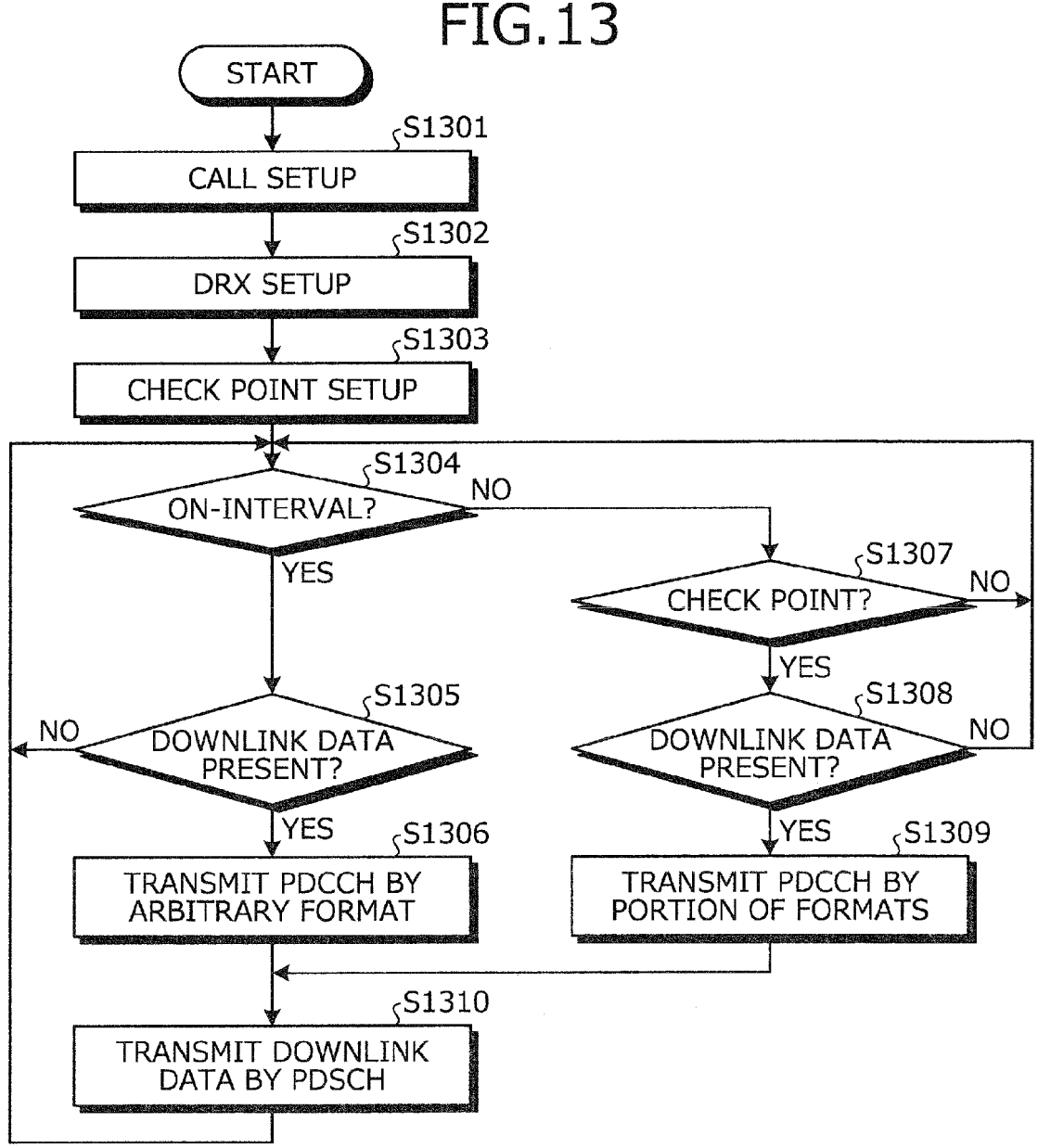
FIG. 13 is a flowchart of an example of operation of the base station according to the first embodiment.

FIG. 13 is a flowchart of an example of operation of the base station according to the first embodiment. The base station 102 according to the first embodiment executes the following steps, for example. First, the base station 102 performs call setup with the mobile station 101 (step S1301). For example, the base station 102 performs the call setup with the mobile station 101 according to the operation depicted in FIG. 6.

The base station 102 performs DRX setup for configuring the ON-intervals 111, 112, . . . (step S1302). The base station 102 performs check-point setup for configuring the check points 121, 122, . . . (step S1303). The order of the DRX setup of step S1302 and the check-point setup of step S1303 may be changed.

The base station 102 determines whether the current time is within an ON-interval (step S1304). If the current time is within an ON-interval (step S1304: YES), the base station 102 determines whether downlink data to the mobile station 101 is present (step S1305). If downlink data is not present (step S1305: NO), the base station 102 returns to step S1304 without transmitting the PDCCHs. If downlink data is present (step S1305: YES), the base station 102 transmits the PDCCH to the mobile station 101 in an arbitrary format (step S1306) and goes to step S1310.

If the current time is not within an ON-interval at step S1304 (step S1304: NO), the base station 102 determines whether the current time is a check point (step S1307). If the current time is not at a check point (step S1307: NO), the base station 102 returns to step S1304 without transmitting the PDCCHs. If the current time is a check point (step S1307: YES), the base station 102 determines whether downlink data to the mobile station 101 is present (step S1308).

If downlink data is not present at step S1308 (step S1308: NO), the base station 102 returns to step S1304 without transmitting the PDCCHs. If downlink data is present (step S1308: YES), the base station 102 transmits the PDCCH by using a portion of the formats (step S1309).

The base station 102 transmits the downlink data addressed to the mobile station 101 through the PDSCH (step S1310) and returns to step S1304. The transmission of the downlink signal of step S1309 is performed by using the wireless resources reported to the mobile station 101 through the PDCCH transmitted at step S1306 or step S1309.

With the steps described above, the base station 102 can transmit the PDCCH during the ON-intervals or at the check points if the downlink data is generated and can transmit the PDCCH by using only limited formats at the check points. The base station 102 can transmit the downlink data by using the wireless resources reported to the mobile station 101 through the transmitted PDCCH.

As described above, the base station 102 according to the first embodiment can transmit a second control signal (RRC connection setup) for configuring a first interval (ON-interval) and a second interval (check point) different from the first interval. The first interval is an interval for monitoring a first control signal (PDCCH) having a relatively large number of types of formats. The base station 102 can transmit the first control signal during the first interval by using any one of the relatively large number of types of formats and can transmit the first control signal during the second interval by using any one of the relatively small number of types of formats.

The mobile station 101 can monitor the first control signal in the first interval for the relatively large number of types of formats and can monitor the first control signal in the second interval for the relatively small number of types of formats. As a result, the intervals for monitoring the first control signal can be increased to reduce a data delay while an increase in power consumption of the mobile station 101 is suppressed.

The mobile station 101 according to the first embodiment can transmit a second control signal (RRC connection setup complete) for configuring the first interval and the second interval different from the first interval. The mobile station 101 can monitor the first control signal in the first interval for the relatively large number of types of formats and can monitor the first control signal during the second interval for the relatively small number of types of formats.

The base station 102 can transmit the first control signal during the first interval by using any one of the relatively large number of types of formats and can transmit the first control signal during the second interval by using any one of the relatively small number of types of formats. As a result, the intervals for monitoring the first control signal can be increased to reduce a data delay while an increase in power consumption of the mobile station 101 is suppressed.

The PDCCH indicative of transmission of data from the base station 102 to the mobile station 101 is applicable to the first control signal. In this case, the first control signal may include information indicative of wireless resources used by the base station 102 for data to the mobile station 101. As a result, the mobile station 101 can receive the data transmitted from the base station 102 based on a result of monitoring of the first control signal.

A second embodiment will be described in terms of portions that differ from the first embodiment. In the second embodiment, a case of carrier aggregation performed by the mobile station 101 and the base station 102 will be described.

When the carrier aggregation is performed, the DRX cycle is conventionally configured only in the primary cell, and the secondary cell follows the DRX cycle of the primary cell. Since the monitoring of the search space of PDCCHs specific to the mobile station and the blind decoding are required also for the secondary cell, the processing of the mobile station increases, resulting in a problem of an increase in power consumption.

In this regard, the mobile station 101 and the base station 102 configure the DRX cycle only for the primary cell during execution of the carrier aggregation. Additionally, the mobile station 101 and the base station 102 configure the check points 121, 122, . . . only for the primary cell. As a result, an increase in power consumption of the mobile station 101 can be suppressed. The mobile station 101 receives the downlink data transmitted through the secondary cell based on the PDCCH transmitted through the primary cell.

Figure 14:
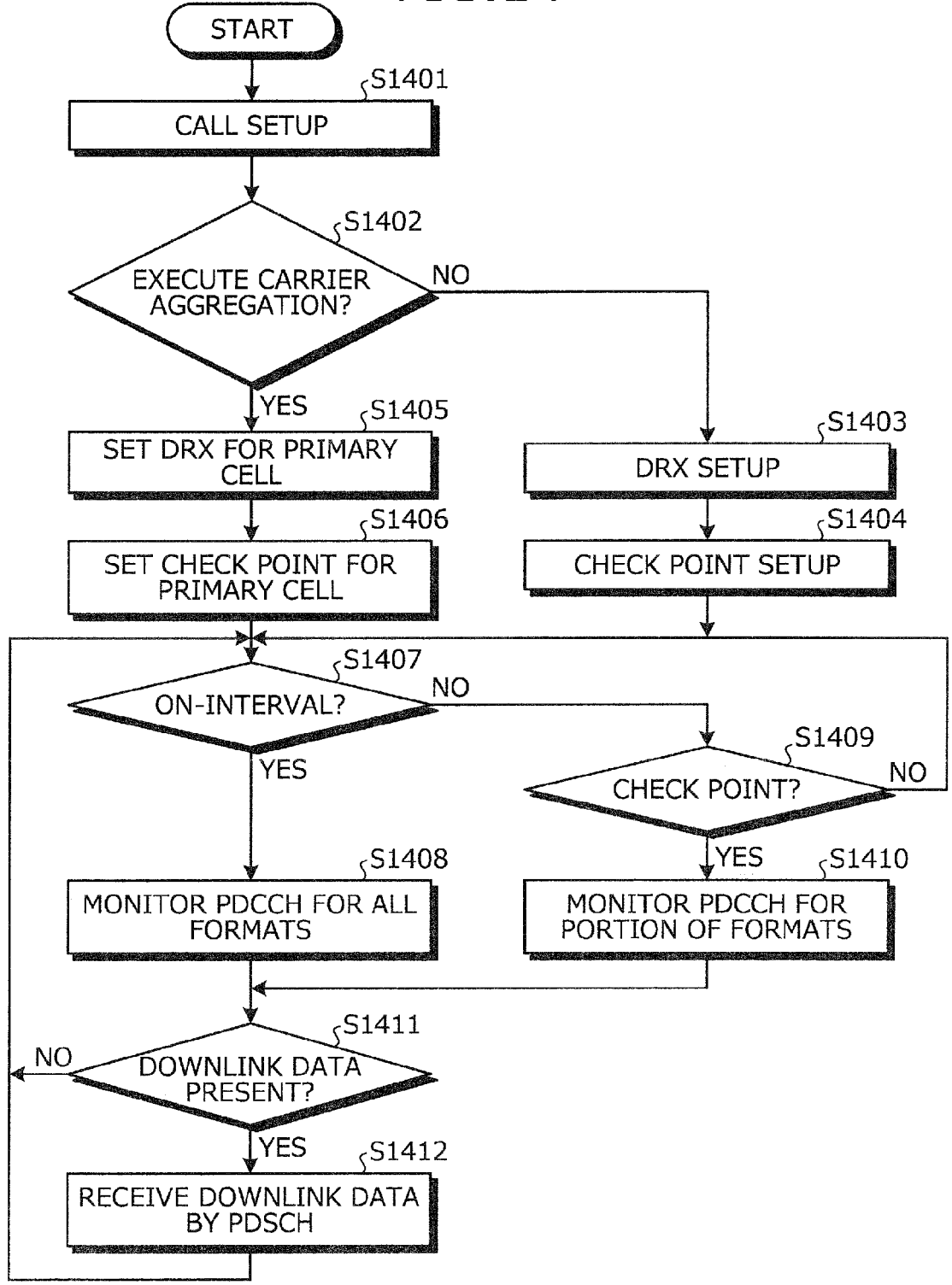
FIG. 14 is a flowchart of an example of operation of the mobile station according to a second embodiment.

FIG. 14 is a flowchart of an example of operation of the mobile station according to the second embodiment. The mobile station 101 according to the second embodiment executes the following steps, for example. First, the mobile station 101 performs call setup with the base station 102 (step S1401). For example, the mobile station 101 performs the call setup with the base station 102 according to the operation depicted in FIG. 6. The mobile station 101 determines whether the carrier aggregation is performed with the base station 102 (step S1402). The determination of step S1402 can be made based on a result of the call setup of step S1401, for example.

If the carrier aggregation is not performed at step S1402 (step S1402: NO), the mobile station 101 performs DRX setup for configuring the ON-intervals 111, 112, . . . (step S1403). The mobile station 101 performs check-point setup for configuring the check points 121, 122, . . . (step S1404) and goes to step S1407. The order of the DRX setup of step S1403 and the check-point setup of step S1404 may be changed.

If the carrier aggregation is performed at step S1402 (step S1402: YES), the mobile station 101 performs DRX setup for configuring the ON-intervals 111, 112, . . . for the primary cell (step S1405). The mobile station 101 performs check-point setup for configuring the check points 121, 122, . . . for the primary cell (step S1406) and goes to step S1407. The order of the DRX setup of step S1405 and the check-point setup of step S1406 may be changed.

Steps S1407 to S1412 are the same as steps S1204 to S1209 depicted in FIG. 12. However, the mobile station 101 executes the operations at steps S1407 to S1412 for the primary cell. For the secondary cell, the mobile station 101 detects the downlink data transmitted through the secondary cell based on a result of the monitoring of the PDCCH of step S1408 or step S1410. The mobile station 101 receives the detected downlink data through the PDSCH of the secondary cell.

With the steps described above, the mobile station 101 can monitor the PDCCH during the ON-intervals and at the check points and can monitor the PDCCH only for limited formats at the check points. The mobile station 101 can receive the downlink data based on the monitoring result of the PDCCHs. The mobile station 101 can monitor the PDCCH only for the primary cell without having to perform the DRX setup and the check-point setup for the secondary cell.

Figure 15:
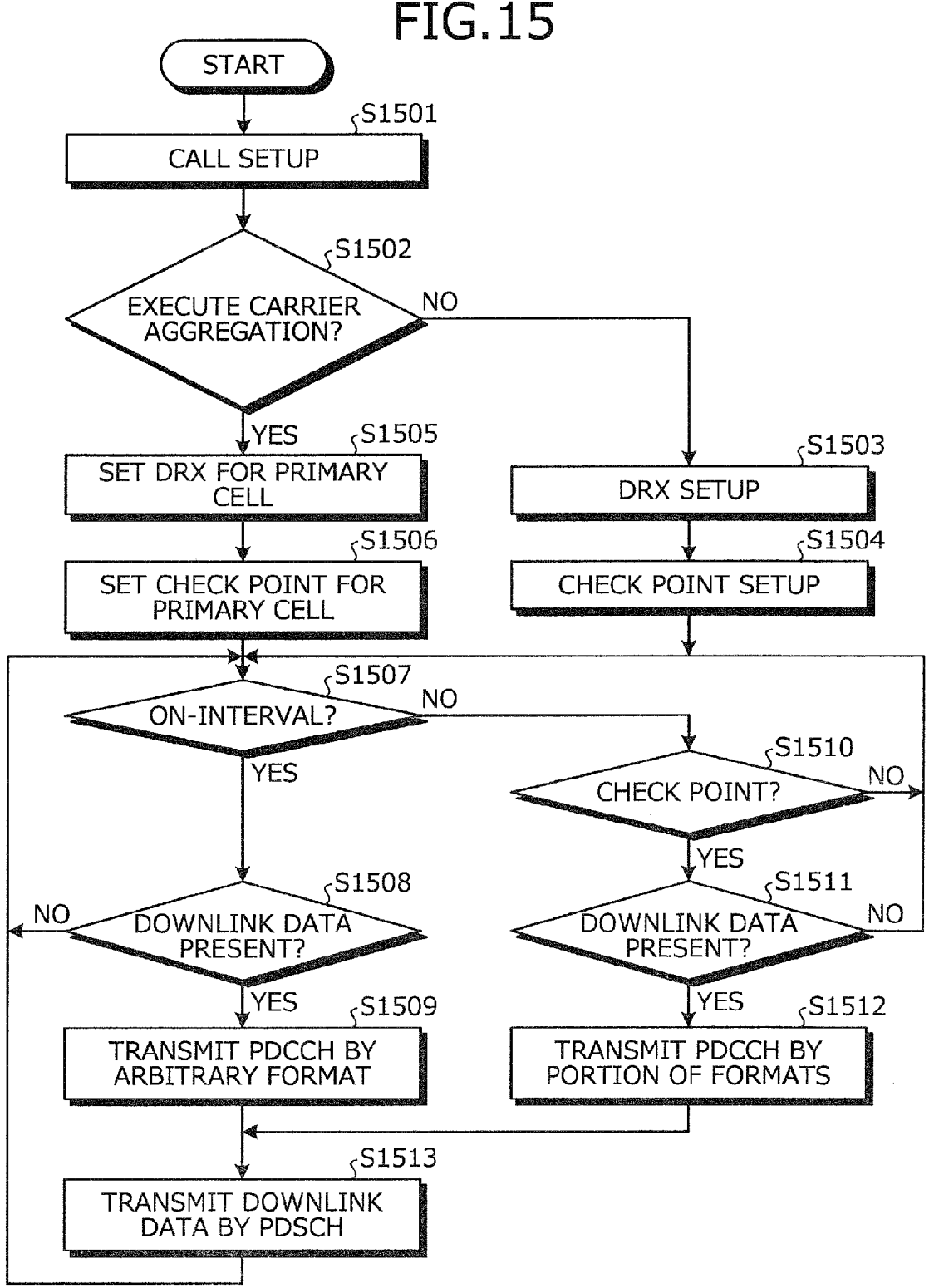
FIG. 15 is a flowchart of an example of operation of the base station according to the second embodiment.

FIG. 15 is a flowchart of an example of operation of the base station according to the second embodiment. The base station 102 according to the second embodiment executes the following steps, for example. First, the base station 102 performs call setup with the mobile station 101 (step S1501). For example, the base station 102 performs the call setup with the mobile station 101 according to the operation depicted in FIG. 6. The base station 102 determines whether the carrier aggregation is performed with the mobile station 101 (step S1502). The determination of step S1502 can be made based on a result of the call setup of step S1501, for example.

If the carrier aggregation is not performed at step S1502 (step S1502: NO), the base station 102 performs DRX setup for configuring the ON-intervals 111, 112, . . . (step S1503). The base station 102 performs check-point setup for configuring the check points 121, 122, . . . (step S1504) and goes to step S1507. The order of the DRX setup of step S1503 and the check-point setup of step S1504 may be changed.

If the carrier aggregation is performed at step S1502 (step S1502: YES), the base station 102 performs DRX setup for configuring the ON-intervals 111, 112, . . . for the primary cell (step S1505). The base station 102 performs check-point setup for configuring the check points 121, 122, . . . for the primary cell (step S1506) and goes to step S1507. The order of the DRX setup of step S1505 and the check-point setup of step S1506 may be changed.

Steps S1507 to S1513 are the same as steps S1304 to S1310 depicted in FIG. 13. However, the base station 102 executes the operations steps S1507 to S1513 for the primary cell. For the secondary cell, the base station 102 transmits the downlink data addressed to the mobile station 101 by using the wireless resource of the secondary cell reported to the mobile station 101 through the PDCCH transmitted at step S1509 or step S1512.

With the steps described above, the base station 102 can transmit the PDCCH during the ON-intervals or at the check points if the downlink data is generated and can transmit the PDCCH by using only the limited formats at the check points. The base station 102 can transmit the downlink data by using the wireless resources reported to the mobile station 101 through the transmitted PDCCH. The base station 102 can transmit the PDCCH only through the primary cell without having to perform the DRX setup and the check-point setup for the secondary cell.

As described above, the wireless communications system according to the second embodiment can produce the same effect as the wireless communications system according to the first embodiment. In the case of the carrier aggregation performed for data communication using multiple cells at the same time, the PDCCH related to multiple cells can be transmitted by using some cells (primary cells) among the multiple cells.

As a result, operation can be such that the mobile station 101 monitors the PDCCH only for some cells and receives the data transmitted from the base station 102 through the multiple cells based on a result of the monitoring. Therefore, even if the carrier aggregation is performed, the monitoring of the PDCCH is performed for only some cells and thus, an increase in power consumption of the mobile station 101 can be suppressed.

Figure 16:
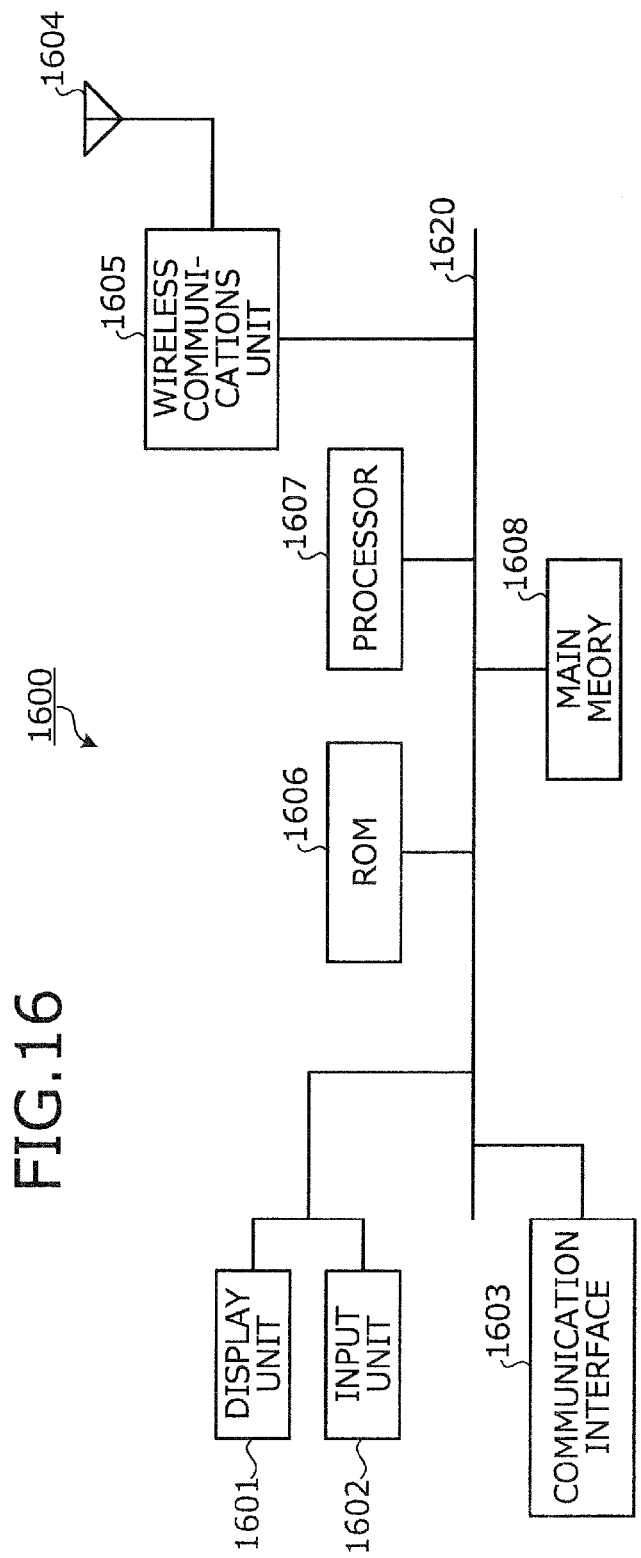
FIG. 16 is a diagram of an example of a hardware structure of the mobile station.

FIG. 16 is a diagram of an example of a hardware structure of the mobile station. The mobile station 101 according to the embodiments described above can be implemented by a communications apparatus 1600 depicted in FIG. 16, for example. The communications apparatus 1600 includes a display unit 1601, an input unit 1602, a communication interface 1603, an antenna 1604, a wireless communications unit 1605, ROM 1606, a processor 1607, main memory 1608, and a bus 1620.

The display unit 1601, the input unit 1602, the communication interface 1603, the wireless communications unit 1605, the ROM 1606, and the main memory 1608 are connected to the processor 1607 through the bus 1620.

The display unit 1601 is a user interface displaying information for an operator. The display unit 1601 is a liquid crystal screen, for example. The input unit 1602 is a user interface that receives an input of information from the operator. The input unit 1602 is a keypad, for example. The operator of the communications apparatus 1600 uses the display unit 1601 and the input unit 1602 to operate the communications apparatus 1600 for the input of a telephone number, etc.

The communication interface 1603 is a speaker and a microphone, for example. The operator of the communications apparatus 1600 uses the communication interface 1603 for a voice call, etc.

The antenna 1604 is connected to the wireless communications unit 1605. The wireless communications unit 1605 performs wireless communication via the antenna 1604 under the control of the processor 1607.

The ROM 1606 stores programs for executing various processes, for example. The processor 1607 reads various programs stored in the ROM 1606 and loads the read programs onto the main memory 1608 to execute various processes. The processor 1607 can be implemented by using a central processing unit (CPU) or a field programmable gate array (FPG), for example.

The antenna 422 depicted in FIG. 4 can be implemented by the antenna 1604, for example. The communications unit 421 depicted in FIG. 4 can be implemented by the processor 1607 and the wireless communications unit 1605, for example. The control unit 410 depicted in FIG. 4 can be implemented by the ROM 1606, the processor 1607, and the main memory 1608, for example.

Figure 17:
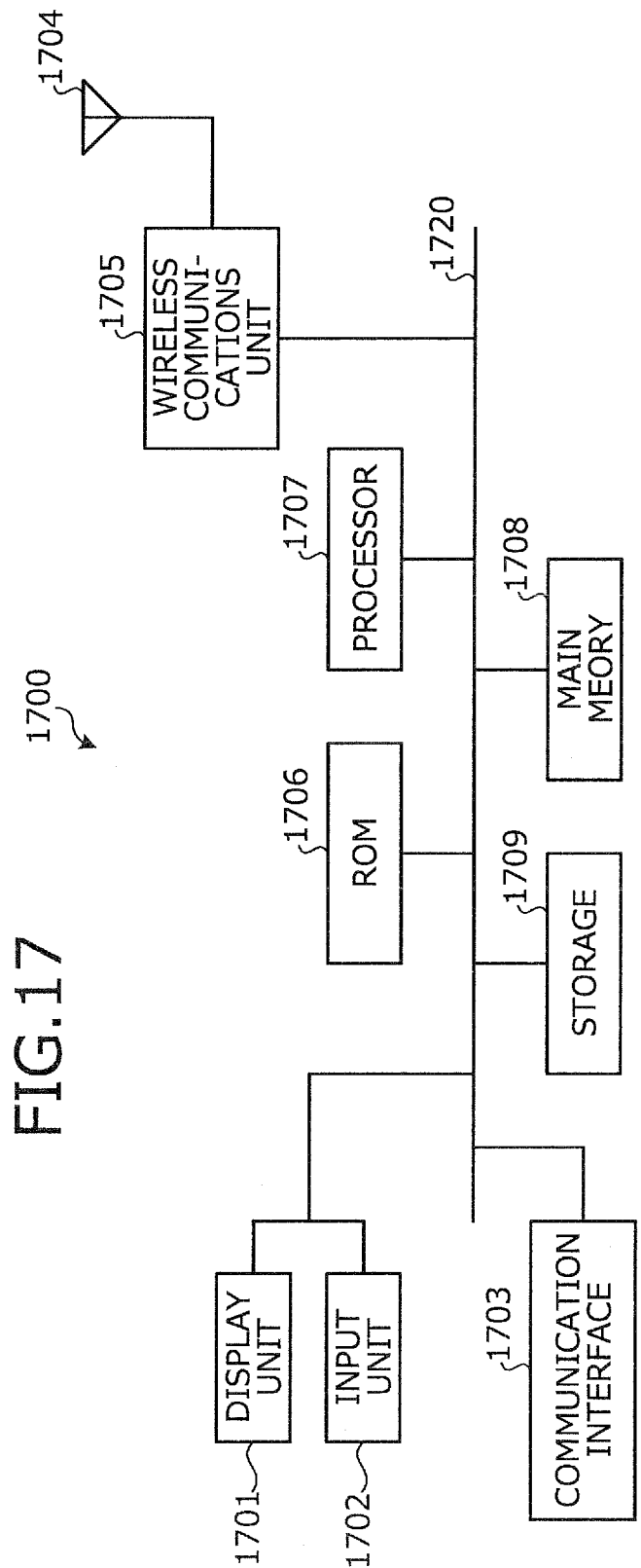
FIG. 17 is a diagram of an example of a hardware structure of the base station.

FIG. 17 is a diagram of an example of a hardware structure of the base station. The base station 102 according to the embodiments described above can be realized by a communications apparatus 1700 depicted in FIG. 17, for example. The communications apparatus 1700 includes a display unit 1701, an input unit 1702, a communication interface 1703, an antenna 1704, a wireless communications unit 1705, ROM 1706, a processor 1707, main memory 1708, storage 1709, and a bus 1720.

The display unit 1701, the input unit 1702, the communication interface 1703, the wireless communications unit 1705, the ROM 1706, the main memory 1708, and the storage 1709 are connected to the processor 1707 through the bus 1720.

The display unit 1701 is a user interface that displays information for an operator. The display unit 1701 is a monitor, for example. The input unit 1702 is a user interface that receives input of information from the operator. The input unit 1702 is a keyboard, for example. The operator of the communications apparatus 1700 uses the display unit 1701 and the input unit 1702 to operate the communications apparatus 1700 perform input for a configuration program, etc.

The communication interface 1703 is a communication interface for communication with a higher-level station, for example. The communication interface 1703 is a network board and an analog/digital converter (ADC), for example.

The antenna 1704 is connected to the wireless communications unit 1705. The wireless communications unit 1705 performs wireless communication via the antenna 1704 under the control of the processor 1707.

The ROM 1706 stores programs for executing various processes, for example. The processor 1707 reads various programs stored in the ROM 1706 and loads the read programs onto the main memory 1708 to execute various processes. The processor 1707 can be implemented by using a CPU or an FPG, for example. The storage 1709 is a storage device such as a hard disk, for example. For example, the storage 1709 and the processor 1707 implement functions of a buffer, etc.

The antenna 522 depicted in FIG. 5 can be implemented by the antenna 1704, for example. The communications unit 521 depicted in FIG. 5 can be implemented by the processor 1707 and the wireless communications unit 1705, for example. The control unit 510 depicted in FIG. 5 can be implemented by the ROM 1706, the processor 1707, and the main memory 1708, for example.

As described above, the wireless communications system, the mobile station, the base station, and the communication method can reduce data delay while an increase in power consumption is suppressed.

Although the PDCCH related to downlink data from the base station 102 to the mobile station 101 is described as an example of the first control signal in the embodiments described above, the first control signal may be a control signal related to uplink data from the mobile station 101 to the base station 102. For example, the first control signal may be the PDCCH including information indicative of wireless resources used for transmission of uplink data from the mobile station 101 to the base station 102. In this case, the mobile station 101 can transmit the uplink data to the base station 102 based on a result of monitoring of the PDCCH.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless communications system comprising:
   a base station; and
   a mobile station, wherein
   the base station determines at least one information among a number of second intervals in each interval other than first intervals, an interval of the second intervals, or timing of the second interval,
   the base station transmits a second control signal used for configuring the first interval during which a first control signal having a plurality of formats is monitored and the second interval that is different from the first interval and that is set within a third interval during which the mobile station does not receive a wireless signal, the third interval being an interval between first intervals, the second control signal includes the determined at least one information, and
   the mobile station monitors the first control signal for the plurality of the formats during the first interval, and monitors the first control signal for formats fewer than the plurality of the formats during the second interval.

2. The wireless communications system according to claim 1, wherein
   the base station transmits the first control signal in any of the plurality of the formats during the first interval, and
   the base station transmits the first control signal in any of the fewer formats during the second interval.

3. The wireless communications system according to claim 1, wherein
   the base station and the mobile station, if the first control signal is transmitted during the second interval, advance a start time of the first interval immediately after the second interval during which the first control signal is transmitted.

4. The wireless communications system according to claim 1, wherein
   if a plurality of cells is used at the same time for performing data communication between the base station and the mobile station,
   the base station transmits the first control signal related to the plurality of the cells to the mobile station through some cells among the plurality of the cells while the mobile station monitors the first control signal for the some cells and performs the data communication through the plurality of the cells based on a result of monitoring the first control signal.

5. The wireless communications system according to claim 1, wherein
   the first control signal indicates that the base station transmits data to the mobile station, and
   the mobile station receives the data transmitted from the base station, based on a result of monitoring the first control signal.

6. The wireless communications system according to claim 5, wherein
   the first control signal includes information that indicates wireless resources used by the base station for transmitting data to the mobile station.

7. The wireless communications system according to claim 1, wherein
   the first control signal includes information that indicates wireless resources used for transmission of data from the mobile station to the base station, and
   the mobile station transmits the data to the base station, based on a result of monitoring of the first control signal.

8. A mobile station configured with intermittent reception, the mobile station comprising:
   a communications unit that receives a second control signal used for configuring a first interval during which a first control signal having a plurality of formats is monitored and a second interval that is different from the first interval and that is set within a third interval during which the mobile station does not receive a wireless signal, the third interval being an interval between first intervals, the second control signal includes a determined at least one information among a number of second intervals in each interval other than first intervals, an interval of the second intervals, or timing of the second interval, and
   a control unit that monitors the first control signal for the plurality of the formats during the first interval, and that monitors the first control signal for formats fewer than the plurality of the formats during the second interval.

9. A base station configured with intermittent reception, the base station comprising:
   a communications unit that determines at least one information among a number of second intervals in each interval other than first intervals, an interval of the second intervals, or timing of the second interval and that transmits a second control signal that configures the first interval during which a first control signal having a plurality of formats is monitored and the second interval that is different from the first interval and that is set within a third interval during which a mobile station does not receive a wireless signal, the third interval being an interval between first intervals, the second control signal includes the determined at least one information, and
   a control unit that controls transmits the first control signal for the plurality of the formats during the first interval, and that transmits the first control signal for formats fewer than the plurality of the formats during the second interval.

10. A wireless communications system comprising:
    a base station; and
    a mobile station, wherein
    the base station determines at least one information among a number of second intervals in each interval other than first intervals, an interval of the second intervals, or timing of the second interval,
    the mobile station receives a second control signal used for configuring the first interval during which a first control signal having a plurality of formats is transmitted and the second interval that is different from the first interval and that is set within a third interval during which the mobile station does not receive a wireless signal, the third interval being an interval between first intervals, the second control signal includes the determined at least one information, the base station transmits the first control signal in any of the plurality of the formats during the first interval, and transmits the first control signal during the second interval by using formats fewer than the plurality of the formats, and the mobile station monitors the first control signal for the plurality of the formats during the first interval, and monitors the first control signal for the fewer formats during the second interval.

\* \* \* \* \*